United States Patent [19]

Allner et al.

[11] Patent Number: 4,888,145
[45] Date of Patent: Dec. 19, 1989

[54] PROCESS FOR PRODUCING A SYNTHETIC RESIN SHEET, ESPECIALLY OF A MULTICOLOR PATTERN

[75] Inventors: Kurt Allner, Troisdorf-Eschmar; Hans Brinkmann, Troisdorf; Bernhard Kraemer; Herbert Schulte, both of Troisdorf-Oberlar, all of Fed. Rep. of Germany

[73] Assignee: Dynamit Nobel AG, Troisdorf, Fed. Rep. of Germany

[21] Appl. No.: 535,256

[22] Filed: Sep. 23, 1983

[30] Foreign Application Priority Data

Sep. 23, 1982 [DE] Fed. Rep. of Germany ....... 3235166

[51] Int. Cl.$^4$ ............................................. B29C 43/30
[52] U.S. Cl. ..................................... 264/126; 264/76; 264/119
[58] Field of Search .................. 264/76, 109, 119, 175, 264/284, 122, 126; 425/328, 194, 363, 505, 519, DIG. 35

[56] References Cited

U.S. PATENT DOCUMENTS

| | | | |
|---|---|---|---|
| 1,001,836 | 8/1911 | Fritz | 264/175 |
| 1,988,787 | 1/1935 | Fowler | 264/175 |
| 2,260,453 | 10/1941 | Hartman | 264/76 |
| 2,319,040 | 5/1943 | Conklin | 264/175 |
| 2,694,831 | 11/1954 | Benedict et al. | 264/175 |
| 3,145,241 | 8/1964 | Powell | 264/76 |
| 3,194,859 | 7/1965 | Wacker | 264/175 |
| 3,323,983 | 6/1967 | Palmer | 425/363 |
| 3,507,943 | 4/1970 | Such et al. | 264/119 |
| 3,560,601 | 2/1971 | Johnson et al. | 264/284 |
| 3,754,065 | 8/1973 | Hofmann et al. | 264/70 |
| 4,029,455 | 6/1977 | Schmidt et al. | 264/76 |
| 4,396,566 | 8/1983 | Brinkmann et al. | 264/70 |

FOREIGN PATENT DOCUMENTS 0948826 6/1974 Canada .
1679822 12/1967 Fed. Rep. of Germany .

Primary Examiner—Jan H. Silbaugh
Assistant Examiner—Mary Lynn Fertig
Attorney, Agent, or Firm—Antonelli, Terry & Wands

[57] ABSTRACT

A process for the production of thick synthetic resin sheets having a multicolor pattern, involves processing heated thermoplastic chips into a coherent sheet by means of a pair of rolls profiled to a depth of about 0.1–0.5 mm which effect partially differing densification.

2 Claims, 2 Drawing Sheets

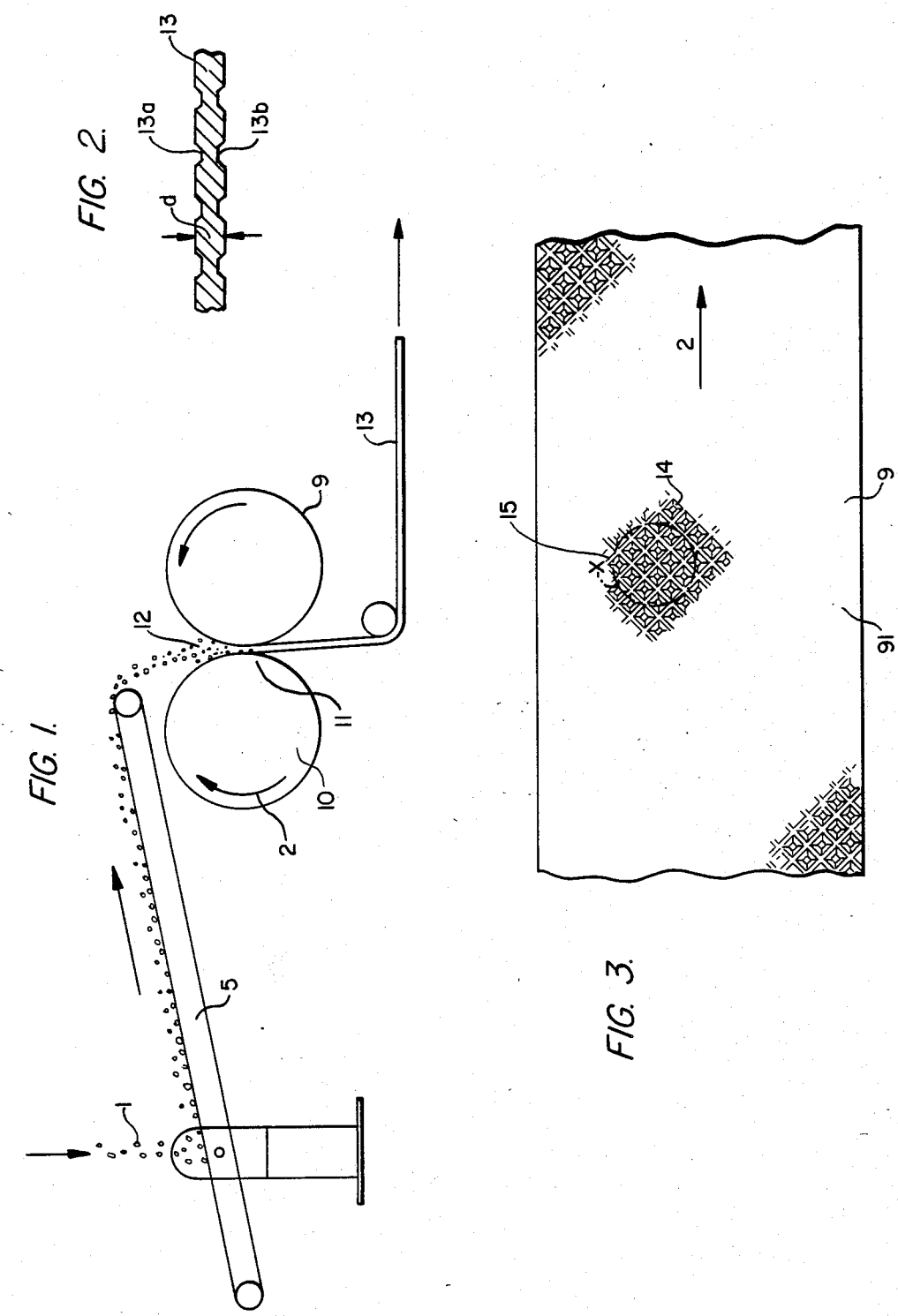

PROCESS FOR PRODUCING A SYNTHETIC RESIN SHEET, ESPECIALLY OF A MULTICOLOR PATTERN

This invention relates to a process for the production of a synthetic resin sheet, especially a thick sheet having a multicolor pattern, by processing heated, thermoplastic chips into a coherent sheet by rolls, and to an apparatus with a pair of rolls comprising two rolls revolving at identical peripheral velocity for conducting the process.

Special care must be taken in the manufacture of thermoplastic synthetic resin sheets having thicknesses of above 1 mm that the sheets are produced without voids; this holds true, in particular, for rolling and calendering processes. In the production of patterned thermoplastic synthetic resin sheets, especially marbled sheets, with the use of the rolling or calendering methods, a pronounced longitudinal orientation of the pattern in the manufacturing direction occurs which, in most cases, is furthermore very much blurred. Thick thermoplastic synthetic resin sheets with patterns, particularly marbling, are required in large quantities, for example, as floor coverings. A number of conventional processes exists with the objective of manufacturing thick, void-free sheets with minimum orientation of the pattern. For example, German Patent 1,679,822 describes a process for the production of synthetic resin sheets having a multicolor pattern from heated thermoplastic chips wherein the chips are stacked and welded together under pressure and, thereafter, the thermoplastic synthetic resin panels are cut off from the welded block in the desired thickness. This method makes it possible to manufacture synthetic resin panels of limited size with a pattern which is not oriented in one direction, and without voids, but is rather expensive due to the discontinuous manufacturing process required.

DOS 3,031,839 discloses a process for the continuous production of sheets from thermoplastic synthetic resins wherein heated chips are stacked continuously and, while passing through a press, are continuously densified, welded together, and cooled. This process also makes it possible to produce void-free, thick thermoplastic synthetic resin sheets with an almost orientation-free, marbled pattern with the use of correspondingly differently dyed chips. A prerequisite for the conductance of this process is a large swing press with a corresponding large pressing power.

Other methods for the production of thermoplastic synthetic resin sheets utilize rolling processes, but in this case, the thermoplastic sheet is built up by joining several superimposed layers, as described, for example in DAS 1,928,405. In this procedure, thin sheet fragments are produced in a small layer thickness by calendering and then, in layered form, joined together by further calendering and then rolled to a smaller thickness. The problem of making these sheets without voids is solved in the first step by the production of thin partial sheets. Void-free sheets can be produced by calendering only to a thickness of about 0.8 mm. For this reason, when using rolling techniques for the production of relatively thick, patterned thermoplastic synthetic resin sheets, a multiple-layer structure with a multistage process is chosen in all cases, as also described, for example, in U.S. Patent No. 3,754,065. The compacting achieved in the linear, smooth roll nip is sufficient according to general experience for calendering or rolling, in a single pass, synthetic resin sheets having a thickness of up to 0.8 mm continuously, just about free of voids. In the manufacture of patterned synthetic resin sheets, there is the additional factor that a relatively thick kneading bead is formed in front of the roll nip, leading to a very pronounced mixing of the colors and, thus, to a blurred pattern; also, a greatly oriented patterning in the manufacturing direction is produced by the calendering step. With the use of flat-pressing operations, in a continuous or discontinuous fashion, void-free synthetic resin sheets can be manufactured with larger thicknesses, but at lower manufacturing speeds, although this provides the advantage of obtaining patterns which are not oriented.

The invention is based on the object of providing an economical, continuous process for the production of thick synthetic resin sheets, especially of a multicolor pattern, of above 1 mm with the use of rolls. According to this invention, the thus-posed object is attained by a process wherein the plastificized chips, which are heated to about 140°–160° C., are drawn into a roll nip profiled on both sides to a depth of about 0.1–0.5 mm, being formed by two profiled rolls and the chips are densified partially and differently at a temperature of the rolls of about 120°–180° C. and with a linear pressure in the roll nip of 100–600 kg/cm, during which step the air occluded between the chips will escape by way of the profiled surface, of the rolls and the chips are shaped into a coherent, void-free sheet having a thickness of at least 1.5 mm with an embossed surface. It has been found, surprisingly, that it is possible by means of the roll nip profiled according to this invention to manufacture, in a single stage, thick thermoplastic synthetic resin sheets which are free of voids. Moreover, the profiled roll nip effects a rapid, direct drawing-in of the chips; i.e., a brief residence time for the chips upstream of the roll nip and, thus, a reduction in the rotating kneading bulge in front of the roll nip, so that, surprisingly, a relatively clear pattern with only very minor longitudinal orientation in the manufacturing direction results. By the partially differing compacting of the sheet, the orientation of the pattern is, furthermore, reduced. While, according to the known methods, void-free sheets can be produced merely up to a thickness of about 0.8 mm with the use of rolls having a smooth surface, and all thicker sheets above 1.0 mm always contained many air occlusions so that they needed additional processing treatments, such as compressing, these drawbacks are, surprisingly, overcome by the process of this invention. ①

The process of this invention uses, for the production of floor coverings having a marbled pattern, preferably chips having a thickness of especially 0.5–10 mm and a length of 5–40 mm, dyed in various colors, made of plasticizer-containing polyvinyl chloride with a plasticizer content of 15–40% and additives, such as fillers, pigments, stabilizers, etc. ②

The manufacturing process of this invention with the use of rolls is essentially based on a specifically developed and adapted profiling of the roll nip; i.e., a corresponding profiling of the roll surfaces, making it possible in spite of the pronounced profiling to (1) The rolls with profiled surfaces suitable to practice the invention have preferably a length of 1 to 2,5 m to manufacture a sheet of a width of at least 0,8 to 2,4 m. To achieve a sheet of a width between 0,8 to 2,4 m with a thickness of 2,5 up to 5 mm the feed rate of the chips to the roll nip is between 380 to 1400 kg/h.

(2) Fillers, for instance chalk, may be used in an amount of 0 to 120 parts by weight with regard to 100 part by weight of PVC. manufacture a relatively smooth, homogeneous, void-free sheet in a single step, with thicknesses of 1.5–5 mm. In this connection, an essential factor is also the linear compacting pressure in the roll nip, the required pressure being decreased when the temperature of the chips to be pressed and the selected roll temperature are increased. On the other hand, the pressure is higher if the thermoplastic synthetic resin charge is harder. Moreover, the pressure also depends on the thickness of the sheet. The linear pressure is the pressure between the rolls in the roll nip parallel to the length of the rolls.

The profiling of the roll surface in conjunction with the temperature level of the rolls and of the chips which are heated up thouroughly in to a plasticized condition by a temperature of about 140° to 160° C. is important for reducing the kneading bulge revolving in front of the roll nip, whereby the residence time of the chips in the kneading bulge is reduced and, thus, a clear design; i.e., pattern is achieved, since the colors cannot intermix to an excessive extent. The reduction of the kneading bulge, therefore, makes it possible to produce the clear, impressive pattern with only little orientation; the longitudinal orientation of the pattern, otherwise typical with calendered thermoplastic synthetic resin sheets, is extensively diminished.

Furthermore, by the profiling of the roll surface according to this invention and by the diminished kneading bulge in front of and within the roll nip, escape of the air occluded in between the chips is, likewise, enhanced, thus making it possible to manufacture the void-free sheet. Also the well plasticized chips are responsible for a homogeneous sheet being manufactured by rolling and pressing.

It has been discovered that a dependency exists between shape and depth of the profiling of the roll nip and/or the roll surfaces, as well as the roll surface temperature, and the quality of the thus-manufactured sheet. The apparatus of this invention for conducting the process is distinguished in that the surfaces of the rolls exhibit uniform profiling in the form of crosswise helically extending channels between which texturing elements each having an approximately truncated-cone shape are formed, wherein the channels have a depth of 0.1–0.5 mm, measured from the surface of the texturing elements. The texturing elements can be, for example, tapering truncated pyramids or like truncated members having a flattened, uppermost surface with inclined surfaces or a conical surface extending down to the bottom surface of a channel and are arranged to form a network of pyramids or like elements on the roll surface. The channels extending between the inclined sides of the texturing elements serve as venting ducts or passages and make it possible for air to exit at the sides of the roll. The flattened surface of the texturing elements can have a cylindrical, rhombic, rectangular, and preferably square configuration with a size of about 0.5–4 mm². These texturing elements, penetrating into the thermoplastic during the molding process of the sheet in the roll nip, additionally densify the sheet. This additional, partial densification makes it possible to impart to the sheet an embossed texture with an overall smooth surface. Furthermore, by this partial compacting, the air occluded in the thermoplastic is urged into the channels and removed laterally of the rolls. The shape of the individual texturing elements must be fashioned to be tapering, generally conical with a top surface area, the generally conical configuration making it possible to readily detach the individual texturing elements from the sheet after leaving the roll nip during the mold-removing process, and the flattened surface area of the texturing elements increasing the degree of densification, depending upon the size.

The roll diameter of the profiled rolls should be chosen so that perfect mold removal with simultaneously satisfactory venting of the sheet is ensured during the profiling treatment; suitable roll diameters range between 300 and 500 mm; roll take-off speeds; i.e., manufacturing rates, are at least within the range from 0.5 to 5 m/min, depending on the thickness of the sheet and the properties of the thermoplastic synthetic resin charge selected for the chips, on the bulk temperature of the chips, the roll temperature and roll profiling, and the selected linear pressure in the roll nip.

The size of the roll nip for producing a synthetic resin sheet having a thickness of 1.5–5 mm is also dependent on the properties of the thermoplastic synthetic resin composition, wherein plasticizer-containing synthetic resin compositions are subject to greater swelling, and highly filled synthetic resin compositions are subject to lesser swelling. The size of the roll nip formed between the surfaces of the texturing elements is about 0.2–1.5 mm for producing sheets having a thickness of about 1.5 mm to 4 mm.

To receive the desired thickness of the sheet, the roll nip has to be smaller. One reason therefore is that the synthetic resin, i.e. the chips are pressed strongly together in the roll nip and after leaving the roll nip, the synthetic resin swells again partially to its former shape and increases the thickness over the thickness of the roll nip.

The selected conicity of the texturing elements should range between 15° and 60°, to make easy extraction possible.

A satisfactory venting action is obtained with the profiling of the rolls according to this invention by providing the bottom surface of the channels with a width at the base of the texturing elements of about 0.2–1.5 mm, preferably 0.2–1.0 mm.

The profiling of the roll surfaces according to this invention can be compared to a fine serration; it is not necessary for the texturing elements of the two rolls to exactly mesh in conducting the process of this invention. If two texturing elements run up against each other, this will, likewise, be absorbed by the thermoplastic sheet.

It is also possible to provide the two rolls with texturing elements which are not exactly the same but, rather, have different forms to provide a different texturing effect. For example, the underside of the thermoplastic sheet to be produced can be provided with a larger embossed texture, so that, for floor coverings, for example, an adhesive can be subsequently applied to this embossed texture.

The invention will be explained by way of example with reference to FIGS. 1–6 of the drawings wherein:

FIG. 1 is a schematic view of the apparatus and the progression of the process;

FIG. 2 shows a fragmentary cross-sectional view of the manufactured sheet;

FIG. 3 shows a schematic partial view of the surface profiling for the roll;

Figure 4:
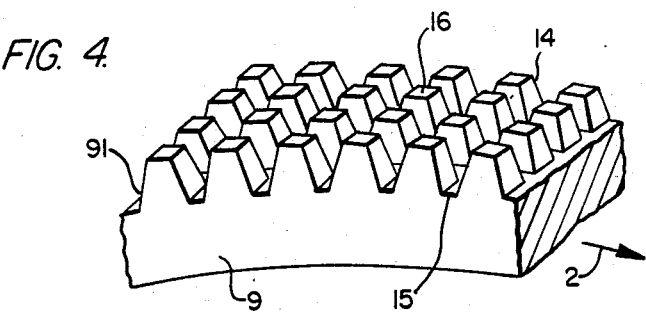
FIG. 4 shows a perspective view of the profiling of the roll surface with texturing elements.

Thermoplastic chips 1 are utilized for manufacturing a thermoplastic, void-free, especially patterned sheet 13 according to FIG. 1. These chips can be produced from calendered thermoplastic sheets by comminuting same, or by extrusion and granulating, and other conventional methods. The average size of the chips should be between 0.5 and 10 mm in thickness, with lengths of between 10 and 40 mm, depending on the pattern desired. It is, likewise, possible to use smaller and larger pieces. The number of individual colors and the quantity of the respective chips, and the size thereof, determine the design appearance of the sheet. The chips 1 may come directly from an extruder being still heated up to about 160° C. and are fed, for example, by means of a revolving and reciprocating conveyor belt 5 to the profiled roll nip 11 formed by the rolls 9, 10. In case the chips are not enough plasticized, an additional infrared heating equipment should be provided in be area of the conveyour belt. The rolls 9, 10 are heated up to a temperature between 120° to 180° C. by heated fluid (inside) the rolls or f.i. electrically by resistance heating. The rolls 9, 10 rotate at the same velocity 2. A kneading bulge 12 is formed upstream of the roll nip 11, which bulge is relatively small in the case of the roll nip 11 with a profile designed in accordance with this invention, due to a corresponding profiling of the roll surfaces of rolls 9, 10; the chips are very quickly drawn into the roll nip 11 by the profiled rolls and densified and compacted into the sheet 13. Preferably, the roll nip is arranged vertically.

FIG. 2 shows schematically, in a cross-sectional view, the manufactured sheet 13. The bilaterally embossed surfaces 13a, 13b of the sheet can be seen from this view. The thickness d of the sheet, which sheet can be produced perfectly free of internal voids by the process and apparatus of this invention, lies between 1.5 and 4 mm. A roll nip of 0.2 to about 1.5 mm corresponds to this thickness of the sheet, depending on the process parameters.

The sheet 13 with embossed surfaces, produced in one step according to the above-described process, is finished in its final form; it can then be cut in the desired dimensions to sheets or panels. It is merely necessary to subject the sheet furthermore to a tempering step to release stresses, for example by means of a heat treatment or other conventional tempering methods. Surface finishing is required only if, for example, a completely planar surface is desired; in such a case, for example, one surface of the sheet 13 can be additionally ground down, or compressed.

Figure 5:
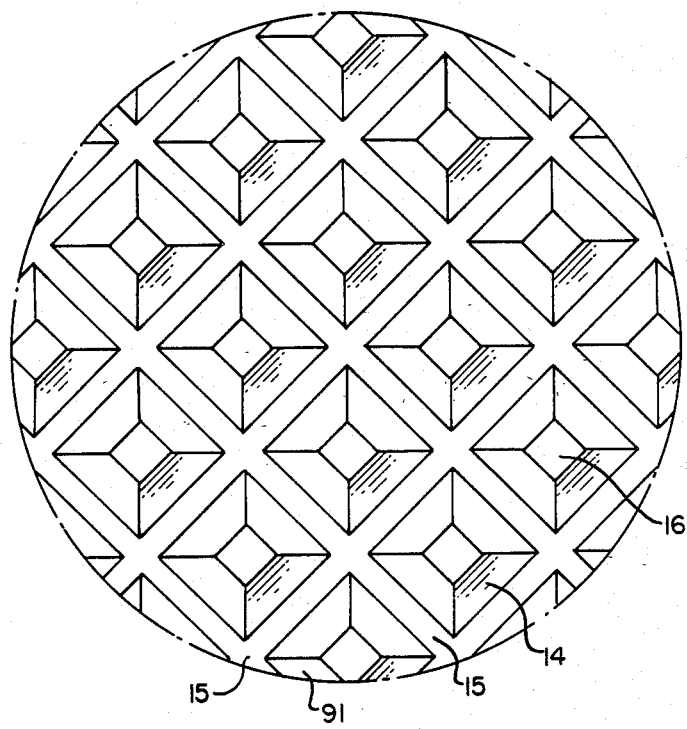
FIG. 5 shows an enlarged top view of the texturing elements according to FIG. 3.
Figure 6:
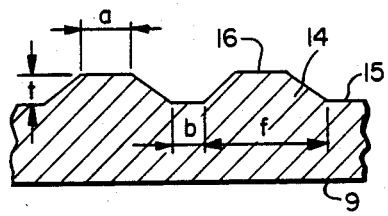
FIG. 6 shows a fragmentary cross-sectional view of the texturing elements.

FIG. 3 illustrates schematically, in a partial top view of the surface 91 of the roll 9, how this surface is profiled. The channels 15 for venting purposes are located so that they extend crosswise over the surface area of the roll 9; numeral 2 indicates the direction of rotation of the roll. Between the mutually intersecting channels 15, the texturing elements 14 are fashioned, which are responsible for the profiling. In FIGS. 4, 5 and 6, an exemplary configuration of the texturing elements is shown in greater detail. In FIG. 4, a lateral view depicts a section of the rolls 9 showing the configuration of the texturing elements 14. The pyramid-like, truncated texturing elements 14 have a flattened surface 16 serving for the partially varying densification of the thermoplastic chips while passing through the roll nip to produce the coherent sheet. The larger this surface 16, the stronger is the partial compacting degree of the sheet. In the top view of FIG. 5, the truncated cone shape of the texturing elements 14 is once more clarified. FIG. 5 practically represents an enlarged illustration of the detailed section X according to FIG. 3. Between the texturing elements 14 extend the crossed channels 15 extending helically over the surfaces of the rolls 9 and 10.

FIG. 6 shows a fragmentary cross section through two texturing elements 14, indicating the essential dimensional data. The flattened surface 16 of the texturing elements has an area (a) that ranges preferably between 0.4 and 4 mm$^2$; the width (b) of the channels 15 ranges preferably between 0.2 and 1.5 mm; the maximum width (f) of the texturing elements at the base is about 3–5 mm; and the depth of the channels (t) is approximately between 0.1 and 0.5 mm.

It is possible by means of the process conditions and the arrangement of the apparatus, in accordance with this invention, to produce, void-free, a thermoplastic synthetic resin sheet having a thickness of 1.5–4 mm with a minor longitudinal orientation of a pattern in multicolor designs. The process is especially economical on account of its one-step character.

What is claimed is:

1. A process for the production of a thick synthetic resin sheet free of voids by processing heated thermoplastic chips into a coherent sheet by use of a pair of rolls, characterized in that the chips, heated to about 140°–160° C., are drawn into a roll nip which is formed by said pair of rolls each having a peripheral profiled surface, said profiled surface including channels extending helically in a crosswise arrangement and texturing elements formed between said channels, the channels having a depth of about 0.1–0.5 mm and the size of the roll nip formed between peripheral surfaces of the texturing elements being about 0.2–1.5 mm, the chips are partially differently densified at a roll temperature of about 120°–180° C. and a linear pressure in the roll nip of 100–600 kg/cm, during which the air occluded in between the chips is removed and allowed to escape by way of the profiled roll surfaces, and the chips are molded into a coherent, void-free sheet having a thickness of at least 1.5 mm with an embossed surface on each side thereof.

2. A process according to claim 1, characterized in that the chips utilized have a thickness of 0.5–10 mm and length of 5–40 mm and are made of plasticizer-containing polyvinyl chloride with a plasticizer content of 15–40% and with additives, including fillers, pigments and stabilizers.

* * * * *